(12) United States Patent
Costenbader (10) Patent No.: US 9,961,967 B2
(45) Date of Patent: May 8, 2018

(54) STRAP TIE-DOWN ASSEMBLY WITH LOCK

(71) Applicant: Cody J. Costenbader, Cave Creek, AZ (US)

(72) Inventor: Cody J. Costenbader, Cave Creek, AZ (US)

( * ) Notice: Subject to any disclaimer, the term of this patent is extended or adjusted under 35 U.S.C. 154(b) by 59 days.

(21) Appl. No.: 14/737,834

(22) Filed: Jun. 12, 2015

(65) Prior Publication Data

US 2016/0360837 A1    Dec. 15, 2016

(51) Int. Cl.
| | | |
|---|---|---|
| *A43C 11/00* | (2006.01) | |
| *A44B 1/04* | (2006.01) | |
| *A44B 11/25* | (2006.01) | |
| *A44B 17/00* | (2006.01) | |
| *A44B 11/12* | (2006.01) | |
| *B60P 7/08* | (2006.01) | |

(52) U.S. Cl.
CPC .......... *A44B 11/125* (2013.01); *B60P 7/0823* (2013.01)

(58) Field of Classification Search
CPC .... E04B 1/34347; A01K 97/10; A47G 29/093
USPC .... 248/499, 500, 503, 505, 510; 24/19, 270, 24/33 R, 68 R, 69 ST, 69 CT, 71 R, 24/71 ST, 71 TD, 68 CD; 254/218
See application file for complete search history.

(56) References Cited

U.S. PATENT DOCUMENTS

| | | | | |
|---|---|---|---|---|
| 3,175,806 A  * | 3/1965 | Ernest, Jr. | ............... | B60P 7/083 24/68 CD |
| 4,227,286 A  * | 10/1980 | Holmberg | ............... | B60P 7/083 24/68 CD |
| 6,682,053 B1 * | 1/2004 | Chou | ...................... | B60P 7/083 24/68 CD |
| 8,209,821 B1 * | 7/2012 | Chen | ...................... | B60P 7/083 24/265 CD |
| 8,408,521 B2 * | 4/2013 | Huang | .................. | B60P 7/0846 24/69 ST |
| 8,444,222 B2 * | 5/2013 | Buckingham | ........ | B60N 2/2806 297/253 |
| 8,776,323 B2 * | 7/2014 | McLennan | ............ | B60P 7/0823 24/170 |
| 8,973,884 B1 * | 3/2015 | Stuckey | ............... | B60N 2/2887 24/68 CD |
| 2007/0200045 A1* | 8/2007 | Ayotte | ..................... | B60Q 7/02 248/505 |
| 2010/0033001 A1* | 2/2010 | Boyer | .................. | B60N 2/2806 297/253 |
| 2010/0180412 A1* | 7/2010 | Huang | .................. | B60P 7/0846 24/71 ST |
| 2010/0181410 A1* | 7/2010 | Ting | ........................ | B60P 7/083 242/395 |
| 2011/0209315 A1* | 9/2011 | Miller | ..................... | B60P 7/083 24/68 CD |
| 2012/0102690 A1* | 5/2012 | Huang | ................... | B60P 7/083 24/68 CD |

(Continued)

*Primary Examiner* — Terrell L McKinnon
*Assistant Examiner* — Michael McDuffle
(74) *Attorney, Agent, or Firm* — Thomas W. Galvani; Thomas W. Galvani, P.C.

(57) ABSTRACT

A strap tie-down assembly for adjustably binding a strap includes opposed first and second handles pivoted to each other about an axle configured to windably receive a strap for binding. A lock is mounted in the assembly for movement between a locked position, in which the lock prevents movement of the axle, and an unlocked position, in which the lock allows movement of the axle.

13 Claims, 8 Drawing Sheets

(56) References Cited

U.S. PATENT DOCUMENTS

2012/0211635 A1* 8/2012 Nemoto ............... B60P 7/0823
  248/499
2014/0062151 A1* 3/2014 Banghart ............. B60N 2/2863
  297/253
2014/0130317 A1* 5/2014 Bermes ................ B25B 25/00
  24/69 CT

* cited by examiner

STRAP TIE-DOWN ASSEMBLY WITH LOCK

FIELD OF THE INVENTION

The present invention relates generally to securement equipment, and more particularly to tie downs for straps, cables, webbing, and the like.

BACKGROUND OF THE INVENTION

Tie-down straps are useful securement equipment for fastening, holding, and securing loads. Most frequently, tie-down straps are used to hold moveable loads in place, for example, holding down pallets of goods, construction equipment, vehicles being towed, dirt bikes, ATVs, camping gear, and other equipment and goods which may be loaded onto a commercial flatbed truck or personal pick-up truck.

Tie-down straps are most frequently secured with tie-down assemblies. These assemblies provide the user with the ability to adjust the tightness of a tie-down strap to a desired level, and typically provide this ability without the concern for loosening during the tightening process. There are a wide variety of strap tie-down assemblies, such as devices based on ratcheting mechanisms, a camming mechanisms, winching mechanisms, and the like. However, none provide the ability to lock the tie-down assembly to prevent unauthorized access to the assembly so that the strap may be removed from the assembly. The ability to lock a tie-down assembly is needed.

SUMMARY OF THE INVENTION

A strap tie-down assembly for adjustably binding a strap includes opposed first and second handles pivoted to each other about an axle configured to windably receive a strap for binding. A lock is mounted in the assembly for movement between a locked position, in which the lock prevents movement of the axle, and an unlocked position, in which the lock allows movement of the axle. When the lock is in the locked position, a strap wound about the axle of the assembly cannot be removed, such that the strap is safely and securely fastened.

BRIEF DESCRIPTION OF THE DRAWINGS

Referring to the drawings.

DETAILED DESCRIPTION

Figure 1A:
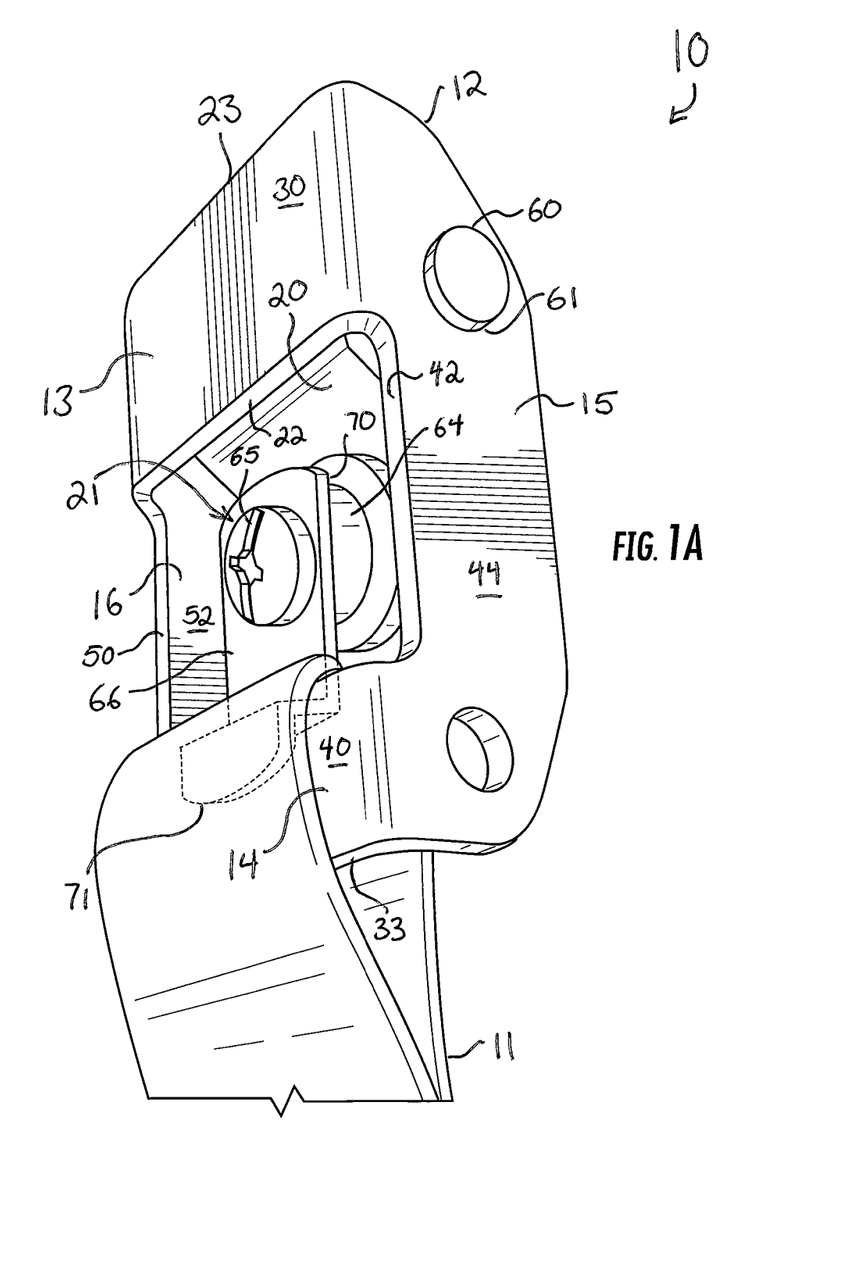
FIG. 1A is a side perspective view of a strap tie-down assembly.
Figure 1B:
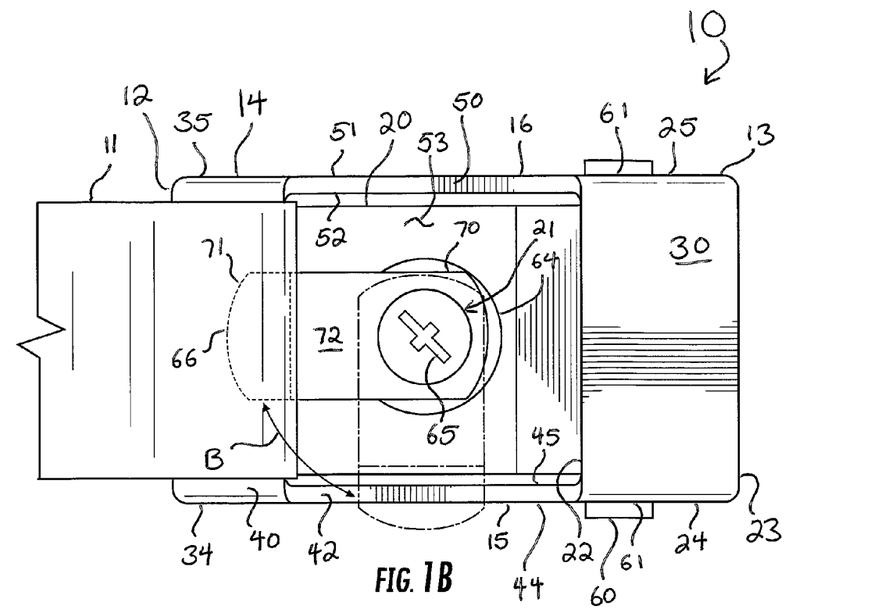
FIGS. 1B and 1C are top plan views and side elevation views, respectively, of the strap tie-down assembly of FIG. 1B.
Figure 1C:
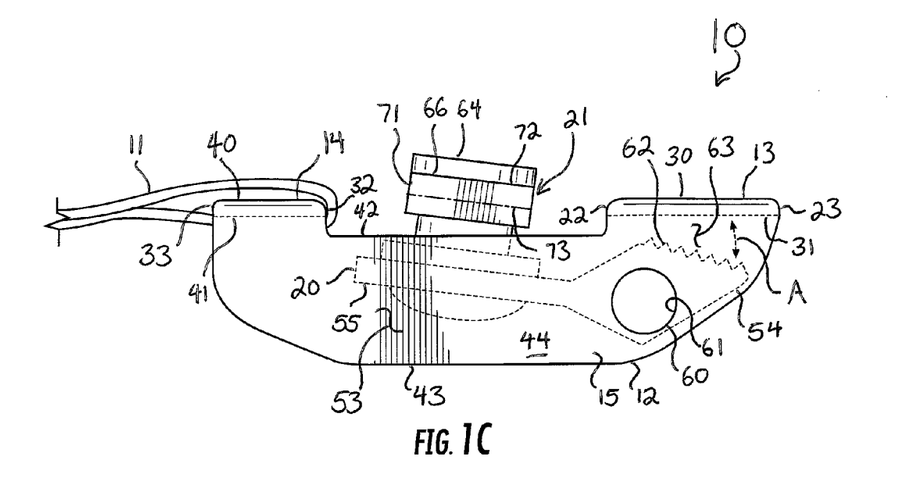

Reference now is made to the drawings, in which the same reference characters are used throughout the different figures to designate the same elements. FIGS. 1A, 1B, and 1C are side perspective, top plan, and side elevation views of a strap tie-down assembly 10 useful for adjustably tightening and binding a strap 11 and locking the strap 11 to prevent unauthorized release thereof. The term "strap" will be used throughout this description and is meant to include various types of webbing, cables, cords, ropes, chains, or other similar flexible lengths of material useful for fastening objects. The assembly 10 includes a body 12 having opposed, spaced-apart first and second end plates 13 and 14, and opposed first and second side plates 15 and 16 extending between the first and second end plates 13 and 14. A jaw 20 is pivoted to the body 12 between the first and second side plates 15 and 16, and a lock 21 on the jaw 20 prevents and allows pivotal movement of the jaw 20 with respect to the body 11. Moving the lock 21 between a locked position and an unlocked position thereof provides a user of the assembly 10 with control of the ability to adjust the length and tightness of the strap 11. The body 12, the jaw 20, and the lock 21 are each constructed from a material or combination of materials having strong, rigid, durable, rugged, and aggressive material characteristics, such as metal (preferably steel or aluminum) or very hard plastic.

The first end plate 13 is a wide, flat piece having a thin vertical profile. The first end plate 13 is generally rectangular, and includes an inner end 22, an outer end 23, and opposed sides 24 and 25. The inner and outer ends 22 and 23 are straight and parallel to each other, the sides 24 and 25 are straight and parallel to each other, and the inner and outer ends 22 and 23 are transverse to the sides 24 and 25. The inner and outer ends 22 and 23 are major ends and the sides 24 and 25 are minor ends; the inner and outer ends 22 and 23 are longer than the sides 24 and 25. The first end plate 13 also includes a top face 30 and an opposed bottom face 31. The first end plate 13 is generally thin between the top and bottom faces 30 and 31.

The second end plate 14 is a wide, flat piece having a thin vertical profile. The second end plate 14 is generally rectangular, and includes an inner end 32, an outer end 33, and opposed sides 34 and 35. The inner and outer ends 32 and 33 are straight and parallel to each other, the sides 34 and 35 are straight and parallel to each other, and the inner and outer ends 32 and 33 are transverse to the sides 34 and 35. The inner and outer ends 32 and 33 are major ends and the sides 34 and 35 are minor ends; the inner and outer ends 32 and 33 are longer than the sides 34 and 35. The second end plate 14 also includes a top face 40 and an opposed bottom face 41. The second end plate 14 is generally thin between the top and bottom faces 40 and 41.

The first and second end plates 13 and 14 are coupled to each other integrally with the first and second side plates 15 and 16. The first and second end plates 13 and 14 are coplanar and spaced apart from each other with the inner ends 22 and 32 disposed toward each other and the outer ends 23 and 33 directed outwardly away from each other. The top faces 30 and 40 are coplanar and aligned with each other, the bottom faces 40 and 41 are coplanar and aligned with each other, the sides 24 and 34 are coplanar and aligned with each other, and the sides 25 and 35 are coplanar and aligned with each other.

The first side plate 15 is a long, thin member. The first side plate 15 is generally C-shaped and includes a short linear top edge 42 and a long curvilinear bottom edge 43 opposed therefrom. The top edge 42 extends between the inner end 22 of the first end plate 13 and the inner end 32 of the second end plate 14. The bottom edge 43 extends between the outer end 23 of the first end plate 13 and the outer end 33 of the second end plate 14. The first side plate 15 is formed integrally to the first and second end plates 13 and 14 and is a monolithic extension thereof. The first side plate 15 has an outer face 44 and an opposed inner face 45; the outer face 44 is a transverse extension of the top faces 30 and 40 of the first and second end plates 13 and 14, respectively, and the inner face 45 is a transverse extension of the bottom faces 31 and 41 of the first and second end plates 13 and 14, respectively.

The second side plate 16 is opposed from the first side plate 15. The second side plate 16 is a long, thin member, is generally C-shaped, and includes a short linear top edge 50 and a long curvilinear bottom edge opposed therefrom. It is noted that FIGS. 1B and 1C hide some portions of the second plate 16, but that the second side plate 16 is identical in all respects to the first side plate 15 other than location and arrangement within the body 12 of the assembly 10, and as such, one having skill in the art will readily appreciate its structure and configuration given the above description of the first side plate 15. Nevertheless, the structure will be discussed. The top edge 50 extends between the inner end 22 of the first end plate 13 and the inner end 32 of the second end plate 14. The bottom edge extends between the outer end 23 of the first end plate 13 and the outer end 33 of the second end plate 14. The second side plate 16 is formed integrally to the first and second end plates 13 and 14 and is a monolithic extension thereof. The first side plate 15 has an outer face 51 and an opposed inner face 52; the outer face 51 is a transverse extension of the top faces 30 and 40 of the first and second end plates 13 and 14, respectively, and the inner face 52 is a transverse extension of the bottom faces 31 and 41 of the first and second end plates 13 and 14, respectively.

The first and second side plates 15 and 16 are spaced apart from each other. The outer faces 44 and 51 and the inner faces 45 and 52 are each parallel to the other. The inner faces 45 and 52 of the first and second side plates 15 and 16, respectively, are spaced apart from each other by the width of the first and second end plates 13 and 14. A hold 53 is defined between the first and second end plates 13 and 14 and the first and second side plates 15 and 16. The hold 53 is bound by the inner faces 45 and 52 of the first and second side plates 15 and 16, respectively, by the top faces 30 and 40 of the first and second end plates 13 and 14, and by the bottom edge 43 of the first side plate 15 and the bottom edge of the second side plate 16.

The jaw 20 is disposed within the hold 53. The jaw 20 is mounted to the body 12 to pivot between a first position and a second position along an arcuate path of motion indicated by double-arrowed line A in FIG. 1C. In the first position of the jaw 20, the jaw 20 is pivoted against the first end plate 13, and in the second position of the jaw 20, the jaw 20 is pivoted away from the first end plate 13. The jaw 20 is an elongate member pivoted to the body 20 proximate to the first end plate 13. The jaw 20 includes a first gripping end 54 and an opposed handled end 55. A pin 60 extends through the gripping end 54 and through opposed and aligned holes 61 formed through the first and second side plates 15 and 16, in which holes 61 the pin 60 is mounted to allow the jaw 20 to pivot. A torsional spring is carried on the pin 60 and is interposed in a compressed fashion between the jaw 20 and the first end plate 13 in a conventional manner so as to bias the jaw 20 toward the first end plate 13. The jaw 20 occupies substantially the entire width of the hold 53 between the first and second side plates 15 and 16.

The gripping end 54 of the jaw 20 includes a plurality of ridges or teeth 62 directed toward the bottom face 31 of the first end plate 13. In the first position of the jaw 20, the teeth 62 are disposed toward or against the bottom face 31, and in the second position of the jaw 20, the teeth 62 are disposed away from the bottom face 31. In use, a free end of the strap 11 is fed between the teeth 62 and the bottom face 31. The first position of the jaw 20 thereby defines an engaged position, in which the teeth 62 of the jaw 20 are biased against the strap and the bottom 31 and resist removal of the strap from the assembly 10. The second position of the jaw 20 defines a disengaged position, in which the teeth 62 of the jaw 20 are moved away from the strap 11 and the bottom 31 to allow the strap 11 to be removed from the assembly 10. In the second position of the jaw 20, the teeth 62 cooperate with the bottom 31 of the first end plate 13 to define a channel 63 therebetween, through which the strap 11 is passable and from which the strap 11 is removable.

The lock 21 is disposed in the hold 53 and is mounted to the jaw 20 for movement between a locked position and an unlocked position. In the locked position, the lock 21 prevents movement of the jaw 20 out of the engaged position, and in the unlocked position, the lock 21 allows movement of the jaw 20 out of the engaged position. The lock 21 includes a cylinder 64, a keyway 65 at a top of the cylinder 64, and a lock arm 66 opposed from the keyway 65 and proximate to the handled end 55 of the jaw 20. The cylinder 64 is a cylindrical housing containing and protecting the mechanical components, such as tumblers, pins, and springs, of the lock 21, and the keyway 65 is a slot providing access to a key into the cylinder 64 to engage with the mechanical components so as to enable a user to move the lock 21 between the locked and unlocked positions. The lock arm 66 is an elongate member having a proximal end 70, an opposed distal end 71, and opposed upper and lower faces 72 and 73. The lock arm 66 is generally oval in footprint, though it can have other suitable shapes, and preferably has a Z-shaped side profile in which the proximal end 70 extends directly radially outward from the cylinder 64 and the distal end 71 is higher or above the proximal end 70 such that the proximal and distal ends 70 and 71 are in offset but parallel planes to each other.

In the locked position of the lock 21, the lock arm 66 is directed toward the second end plate 14 such that the upper face 72 is in contact with the bottom face 41 of the second end plate 14. To move the jaw 20 out of the engaged position, the jaw must be pivoted away from the first end plate 13, thereby pivoting the handled end 55 from below the bottom face 41 of the second end plate 14 to above the top face 40 of the second end plate 14 as the teeth 62 on the gripping end 54 move from against the bottom face 31 of the first end plate 13 to away from the bottom face 31 of the first end plate 13. When the lock arm 66 is directed toward the second end plate 14, however, the upper face 72 is in contact with the bottom face 41 of the second end plate 14 and the jaw 20 cannot be moved. Thus, interaction between the upper face 72 and the bottom face 41 of the second end plate 14 prevents movement of the jaw 20 out of the engaged position.

In the unlocked position of the lock 21, the lock arm 66 is directed away from the second end plate 14 and is able to move clear of the second end plate 14. The lock arm 66 pivots approximately ninety degrees in alignment between the locked and unlocked positions of the lock 21 along the double-arrowed arcuate line B indicated in FIG. 1B. Lines A and B each define planes of movement which are normal to each other; thus, the jaw 20 is pivoted to move in a plane of movement which is normal to a plane of movement in which the lock arm 66 pivots between the locked and unlocked positions. In the unlocked position of the lock 21, the distal end 66 of the lock arm 66 is above the top edge 42 of the first side plate 15, as shown in FIGS. 1B and 1C, is out of the hold 53, and is disposed through the same plane as the first and second end plates 13 and 14. In this position of the lock arm 66, the lock arm 66 is away from interaction and interference with the second end plate 14, and the jaw 20 is free to pivot along double-arrowed line A, so that the handled end 55 can be moved from below the bottom face 41 of the second end plate 14 to above the top face 40 of the second end plate 14 as the teeth 62 on the gripping end 54 move from against the bottom face 31 of the first end plate 13 to away from the bottom face 31 of the first end plate 13.

In operation, a user moves the lock 21 into the disengaged position thereof by inserting a key corresponding to the lock 21 into the keyway 65, turning the key and thereby rotating the lock arm 66 from engagement with the second end plate 14, as shown in FIG. 1B, to above the first side plate 15, as shown in FIG. 1C. When the lock arm 66 is above the first side plate 15, the jaw 20 is able to pivot out of the engaged position and also between the engaged position and the disengaged position. The user moves the jaw 20 into the disengaged position by pressing the handled end 55 toward the second end plate 14 and out of the hold 53, thereby causing the gripping end 54 and the teeth 62 formed thereon to move away from the bottom face 31 of the first end plate 13 so as to form the channel 63. The user may then pass the free end of the strap 11 through the channel 63. Releasing the handled end 55 will cause the gripping end 54 to quickly pivot back toward the first end plate 13, thereby biting the strap 11 between the teeth 62 on the gripping end 54 and the bottom face 31. With the teeth 62 biting into the strap 11 in this way, the strap 11 cannot be removed without first moving the jaw 20. The user can pull on the free end of the strap 11 to further tighten the strap 11 in the assembly 10. When the user has achieved the desired level of tightness and security with the strap 11, the user locks the assembly 10. To lock the assembly 10, the user inserts the key into the keyway 65 and turns the key, thereby causing the lock arm 66 to rotate back toward the second end plate 14. When the lock arm 66 is directed toward the second end plate 14, the upper face 72 is in contact with the bottom face 41 of the second end plate 14 and the jaw 20 cannot be moved. Thus, interaction between the upper face 72 and the bottom face 41 of the second end plate 14 prevents movement of the jaw 20 out of the engaged position, the strap 11 cannot be removed from the channel 63, and the assembly 10 is effectively locked.

Figure 2A:
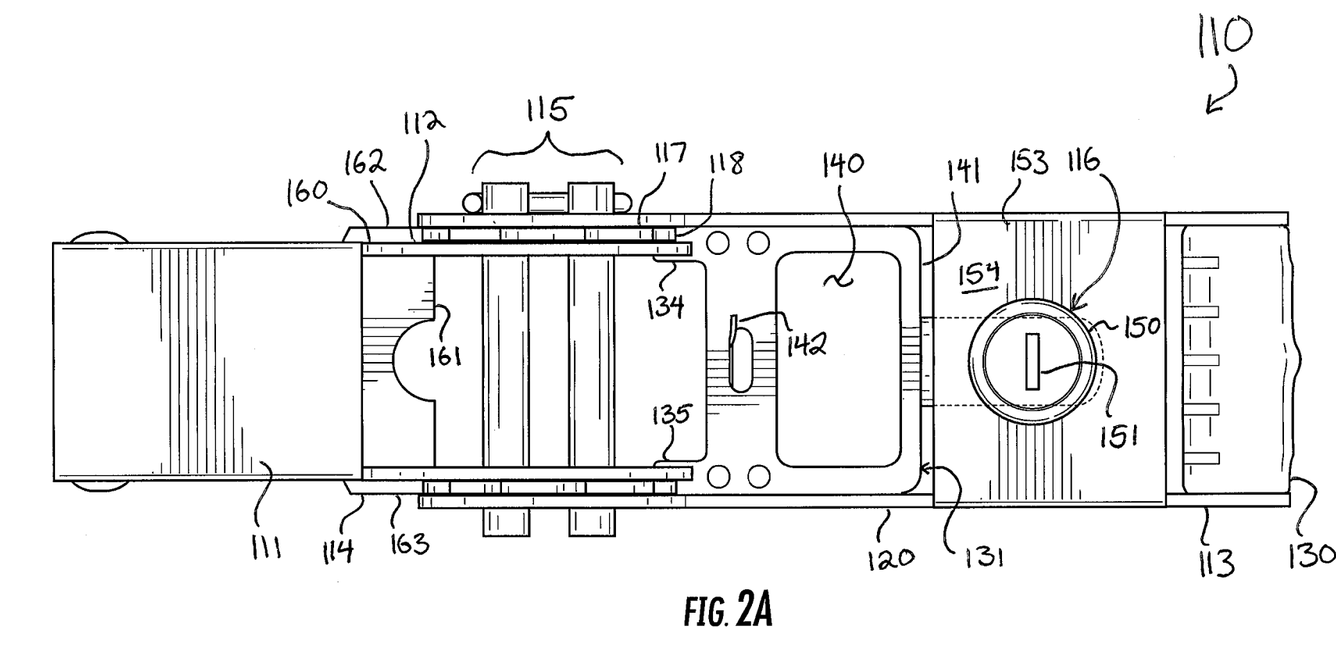
FIG. 2A is a top perspective view of a strap tie-down assembly.
Figure 2B:
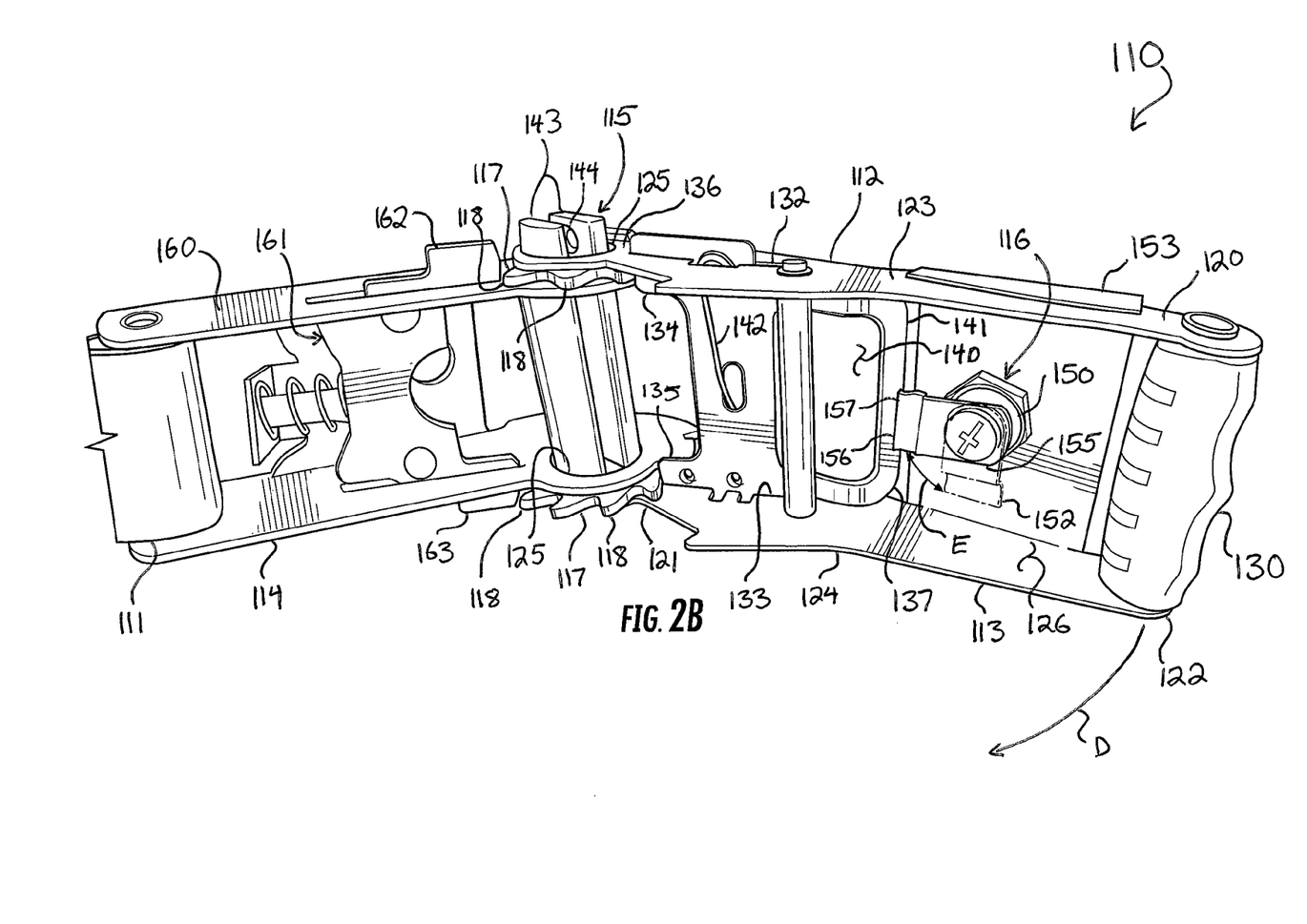
FIGS. 2B and 2C are enlarged, bottom perspective views of the strap tie-down assembly of FIG. 2A.
Figure 2C:
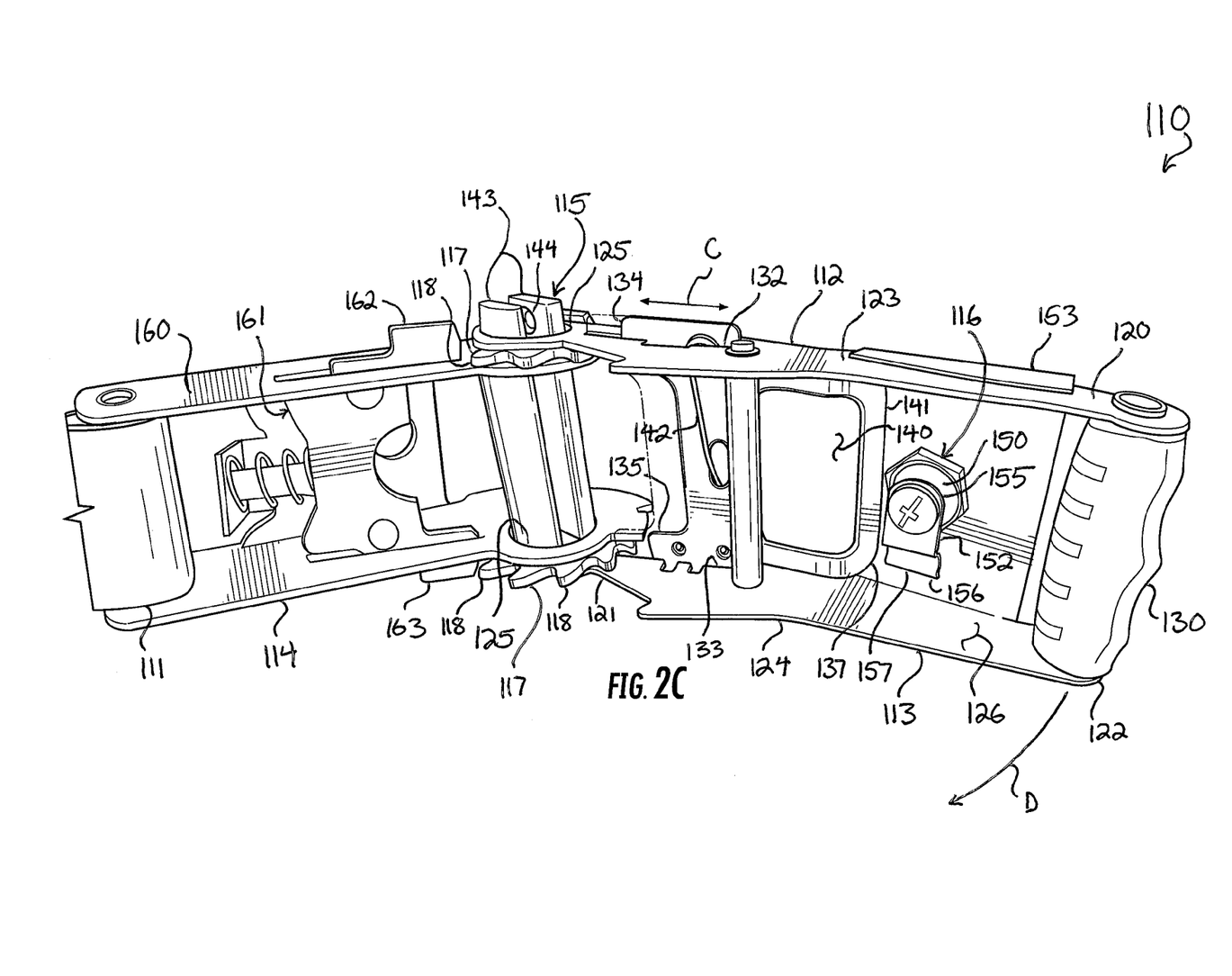

FIGS. 2A-2C illustrate another embodiment of a strap tie-down assembly 110 useful for adjustably tightening a strap 111 and locking the strap 111 to prevent unauthorized access thereto and release thereof. FIG. 2A is a top perspective view of the assembly 110, and FIGS. 2B and 2C are enlarged, bottom perspective views of the assembly 110 in a locked and unlocked configuration, respectively. The assembly 110 is somewhat similar to the assembly 10. The assembly 110 includes a body 112 having opposed first and second handles 113 and 114. The first and second handles 113 and 114 are mounted and pivoted to each other on an axle 115 for pivotal movement about the axle 115. The axle 115 is configured to windably receive a strap for binding and securing the strap in the assembly 110. A lock 116 is mounted to the body 112 for movement between a locked position (shown in FIG. 2B) and an unlocked position (shown in FIG. 2C). In the locked position, the strap 111 cannot be removed from the assembly 110, while in the unlocked position, the strap 111 can be removed from the assembly 110. The lock 116 thus provides a valuable mechanism for preventing unauthorized access to and release of the assembly 110. The first and second handles 113 and 114, the axle 115, and the lock 116 are each constructed from a material or combination of materials having strong, rigid, durable, rugged, and aggressive material characteristics, such as metal (preferably steel or aluminum) or very hard plastic.

Referring primarily now to FIGS. 2B and 2C, the first handle 113 includes a monolithic frame 120 having opposed inner and outer ends 121 and 122 and opposed side members 123 and 124 extending between the inner and outer ends 121 and 122 and defining an open bottom 126. Bores 125 are formed through the side members 123 and 124 at the inner end 121 of the frame 120, and the axle 115 is disposed through and fixed in these bores 125. Opposite the axle 115, a grip 130 extends transversely between the side members 123 and 124 at the outer end 122 of the frame 120, and the grip 130 is fixed and secured to the side members 124 and 124, such as with rivets, bolts, screws, or other like fasteners.

A release mechanism 131 is carried in the frame 120 at the inner end 121. The release mechanism 131 engages with the axle 115 to selectively lock and unlock the axle 115 with respect to the first handle 113. Carried on the axle 115 are opposed and identical ratchet wheels 117 (one proximate to each of the side members 123 and 124) with a plurality of forwardly-pitched teeth 118. The release mechanism 131 engages with the teeth 118 of each of the ratchet wheels 117 to either allow the ratchet wheels 117 to rotate or prevent the ratchet wheels 117 from rotating. The release mechanism 117 is a generally flat plate carried in the frame 120 in slots 132 and 133 formed in the side members 123 and 124, respectively. The release mechanism has two pawls 134 and 135 which project inward toward the ratchet wheels 117 at an inner end 136 of the release mechanism 131. As the release mechanism 131 moves or is moved, the pawls 134 and 135 interact with the teeth 118 on the ratchet wheels 117. Opposite the pawls 134 and 135 at an outer end 137 of the release mechanism 131, the release mechanism 131 has a void 140 formed entirely through the release mechanism 131 which defines a pull 141. The pull 141, and the void 140 defining the pull 141, are each sized and shaped to allow a user to insert a finger, or preferably at least two fingers, through the void 140 and against the pull 141, so that the user may draw the release mechanism 131 back by pulling against the pull 141. The release mechanism 131 is urged toward the axle 115. A torsion spring 142 is carried between the release mechanism 131 and the side member 123 to bias the release mechanism 131 toward the axle 115.

The release mechanism 131 is mounted to the frame 120 of the first handle 113 for reciprocal movement between an advanced, engaged position with respect to the ratchet wheels 117, as shown in FIG. 2B) and a retracted, disengaged position with respect to the ratchet wheels 117 (as shown in FIG. 2C). The release mechanism 131 reciprocates along the length of the first handle 117, in a direction indicated by double-arrowed line C in FIG. 2C. When the release mechanism 131 is advanced into the engaged position thereof, as shown in FIG. 2B, the pawls 134 and 135 are engaged with the teeth 118 of the ratchet wheels 117. The release mechanism 131 is biased into the engaged position along line C toward the axle 115 by the torsion spring 142. The first handle 113 may be moved, or "closed," along the direction indicated by the arcuate line D in FIG. 2B without causing movement in the ratchet wheels 117 or the axle 115; the pawls slide over and onto each subsequent tooth 118, cyclically sliding over one tooth 118 and springing into the bottom land between that tooth 118 and the next tooth 118. However, when the release mechanism 131 is in the engaged position thereof and the first handle 113 is moved in opposition to the arcuate line D in FIG. 2B, the pawls 134 and 135 cause the ratchet wheels 117 and the axle 115 to rotate with the first handle 113, in opposition to the arcuate line D. The pawls 134 and 135 engage and catch the faces of the teeth 118 and do not move over the teeth 118, thereby causing the ratchet wheels 117 and the axle 115 to move with the first handle 113. When the release mechanism 131 is in the disengaged position, the pawls 134 and 135 are away from the teeth 118 of the ratchet wheels 117 and impart no movement to the ratchet wheels 117, regardless of how the first handle 113 is moved along the line D.

The ratchet wheels 117 are fixed on the axle 115. The axle 115 is bifurcated into two semi-cylindrical posts 143 which rotate together. The strap to be wound about the axle is commonly first passed between the posts 143 for added security of the strap on the axle 115. The ratchet wheels 117 are each formed with two semi-cylindrical slots through which the posts 143 of the axle 115 pass through. A post or stud 144 on the axle 115 prevents lateral movement of the ratchet wheels 117 on the axle 115. In other embodiments, a cotter pin is used to secure the ratchet wheels 117 laterally on the axle 115.

The lock 116 is mounted to the first handle 113 for movement between the locked and unlocked positions. In the locked position, the lock 116 prevents movement of the release mechanism 131 out of the engaged position, and in the unlocked position, the lock 116 allows movement of the release mechanism 131 out of the engaged position. Thus, in the locked position, the strap 111 cannot be removed from the assembly 110, but in the unlocked position, the strap 111 can be removed from the assembly 110. The lock 116 includes a cylinder 150, a keyway 151 at a top of the cylinder 150, and a lock arm 152. The cylinder 150 is mounted in a top plate 153 secured across the side members 123 and 124 proximate to the grip 130, opposite the open bottom 126 of the first handle 113. The cylinder 150 is a cylindrical housing containing and protecting the mechanical components, such as a tumblers, pins, and springs, of the lock 116. The keyway 151 is disposed and exposed on a top surface 154 of the top plate 153 and is a slot providing access to a key into the cylinder 150 to engage with the mechanical components so as to enable a user to move the lock 116 between the locked and unlocked positions. The cylinder 150 extends through the top plate 153 so that the lock arm 152 is opposite the keyway 151 below the top plate 153. The lock arm 152 is an elongate member having a proximal end 155, a distal end 156, and an abutment face 157 at the distal end 156. The lock arm 152 is generally rectangular in footprint, though it can have other suitable shapes, and preferably has a Z-shaped side profile in which the proximal end 155 extends directly radially outward from the cylinder 150 and the distal end 156 is closer to the top plate 153 than the proximal end 155 such that the proximal and distal ends 155 and 156 are in offset but parallel planes to each other. The abutment face 157 is at the distal end 156 and is transverse to both the proximal and distal ends 155 and 156.

In the locked position of the lock 116, the lock arm 152 is directed toward the outer end 137 of the release mechanism 131 such that the abutment face 157 is in flush contact with the pull 141 of the release mechanism 131. The lock arm 152 is aligned along the direction of reciprocal movement of the release mechanism 131 along line C. To move the release mechanism 131 out of the engaged position thereof, the release mechanism 131 must be drawn back away from the axle 115 and toward the grip 130, along the line C of FIG. 2C. When the lock arm 152 is directed toward the pull 141, however, the abutment face 157 is in contact with the pull 141 and the release mechanism 131 cannot be moved. Thus, interaction between the flat abutment face 157 of the lock arm 152 and the pull 141 of the release mechanism 131 prevents movement of the release mechanism 131 out of the engaged position shown in FIG. 2B. In the engaged position of the release mechanism 131 and the locked position of the lock 116, the pawls 134 and 135 are in contact with and cannot be moved over the teeth 118 of the ratchet wheels 117. The lock 116 prevents rearward movement of the release mechanism 131, thus preventing the pawls 134 and 135 from being drawn back with the release mechanism 131, and thus preventing the pawls 134 and 135 from disengaging from the teeth 118 of the ratchet wheels 117. In this way, the first handle 113 cannot be moved to impart relative movement to the ratchet wheels 117 and thus cannot impart relative movement to the axle 115, about which the strap 111 is wound. The lock 116 thus prevents the strap 111 from being unwound and removed from the assembly 10.

In the unlocked position of the lock 116, the lock arm 152 is directed away from the pull 141 of the release mechanism 131 and is able to move clear of reciprocation of the release mechanism 131. The lock arm 152 pivots approximately ninety degrees in alignment between the locked and unlocked positions of the lock 116 along the double-arrowed arcuate line E shown in FIG. 2B. Lines D and E each define planes of movement which are normal to each other; thus, the first handle 113 is pivoted to move in a plane of movement which is normal to the plane of movement in which the lock arm 152 pivots between the locked and unlocked positions. In the unlocked position of the lock 116, the lock arm 152 is away from interaction and interference with the pull 141 of the release mechanism 131, and the release mechanism 131 is free to reciprocate along the double-arrowed line C.

Opposite the first handle 113, the second handle 114 has a similar structure to the first handle 113. The second handle includes a frame 160 to which the strap 111 may be attached. The frame 160 carries a release mechanism 161, similar to the release mechanism 131, which includes pawls 162 and 163 that engage with the teeth 118 of the ratchet wheels 117. The release mechanism 161 is mounted for movement between an advanced position and a retracted position. In the advanced position of the release mechanism 161, the pawls 162 and 163 are engaged in contact with the teeth 118 of the ratchet wheels 117. In the retracted position of the release mechanism 161, the pawls 162 and 163 are disengaged from the teeth 118 of the ratchet wheels 117.

In operation, a user uses the lock 116 to prevent unwinding of the strap 111 from the assembly 110 after the user has tightened the strap about an object. The first and second handles 113 and 114 are used to ratchet the strap 111 down in increasing tightness about an object. When the strap 111 has been tightened to the user's desired level of security, the user inserts a key corresponding to the lock 116 into the keyway 151 and turns the key, thereby aligning the tumblers within the cylinder 150 so as to allow the lock arm 152 to rotate into engagement with the release mechanism 131, as shown in FIG. 2B. The user rotates the lock arm 152 into the engaged position toward the pull 141 of the release mechanism 131. In this locked position, the release mechanism 131 cannot be retracted and the pawls 134 and 135 cannot be moved out of the engaged position with the teeth 118 of the ratchet wheels 117, so that the axle 115 cannot be rotated with respect to the first handle 113 and the strap 111 thus unwound.

When the user desires to loosen the strap 111, the user inserts the key into the keyway 151 and turns the key to rotate the lock arm 152 away from the position shown in solid line in FIG. 2B and into the position shown in FIG. 2C. With the lock 116 in the unlocked position thereof, the lock arm 152 is away from the release mechanism 131 and allows movement of the pawls 134 and 135 both out of the engaged position and between the engaged and disengaged positions. The user moves the release mechanism 131 into the disengaged position by inserting one, two, or more fingers into the void 140 and drawing back on the pull 141 to retract the release mechanism along line C toward the grip 130, thereby causing the pawls 134 and 135 to disengage from the teeth 118 of the ratchet wheels 117. The user may then pull on a free end of a strap wound about the axle 115 to cause the strap to unwind. Withdrawing fingers from the void 140 will cause the release mechanism 131 to snap back toward the axle 115 and cause the pawls 134 and 135 to re-engage with the teeth 118. The strap cannot be unwound in this configuration unless the user retracts the release mechanism 131.

Figure 3A:
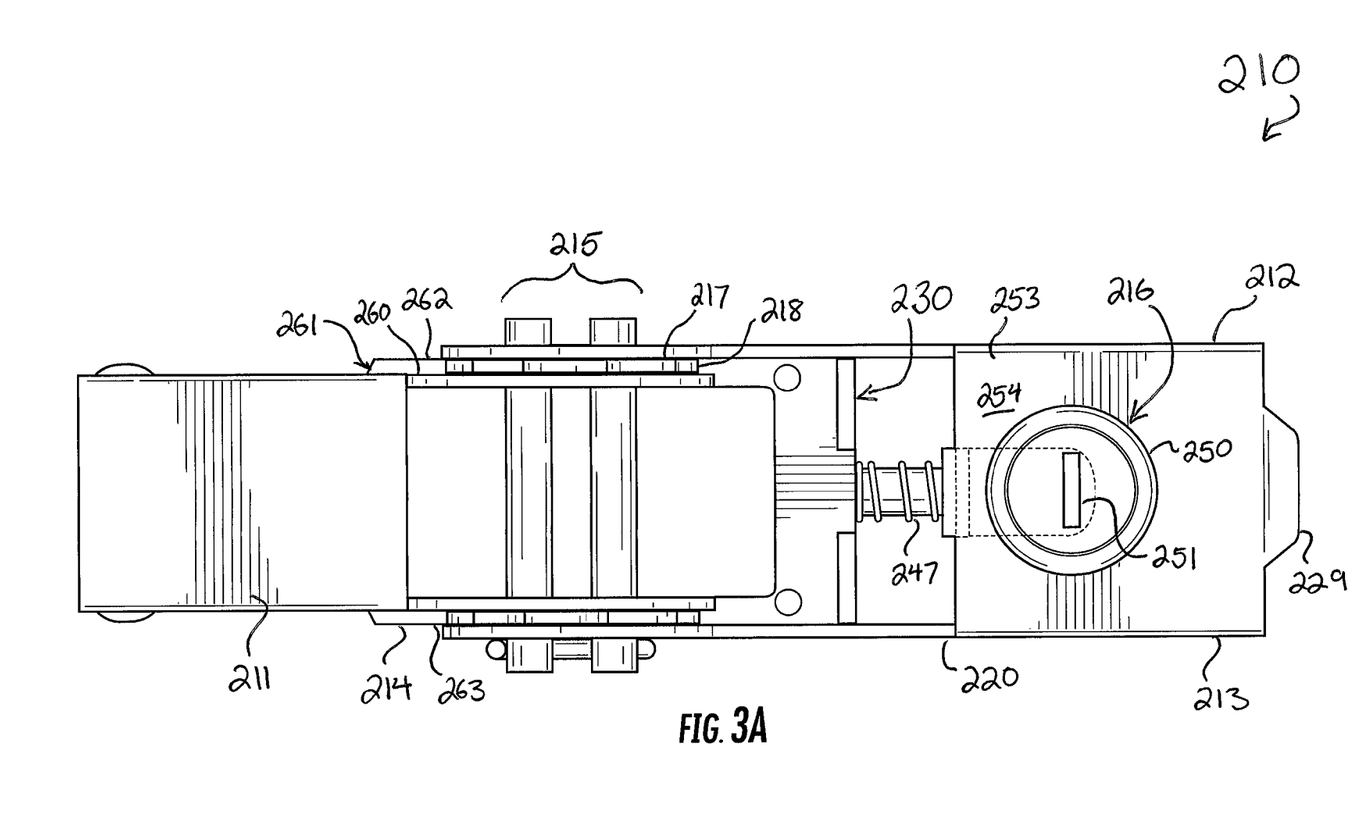
FIG. 3A is a top perspective view of a strap tie-down assembly.
Figure 3B:
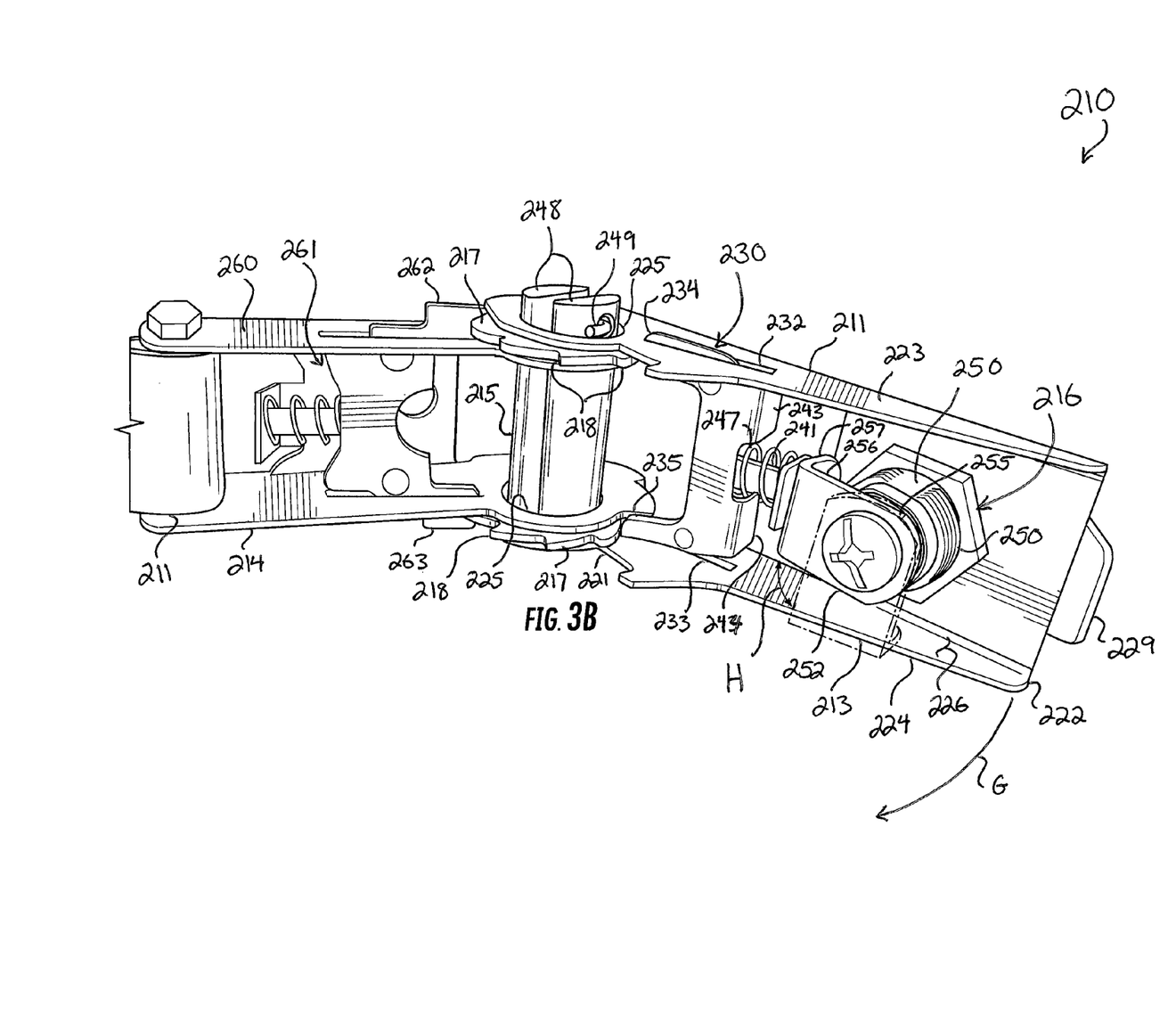
FIGS. 3B and 3C are enlarged, bottom perspective views of the strap tie-down assembly of FIG. 3A.
Figure 3C:
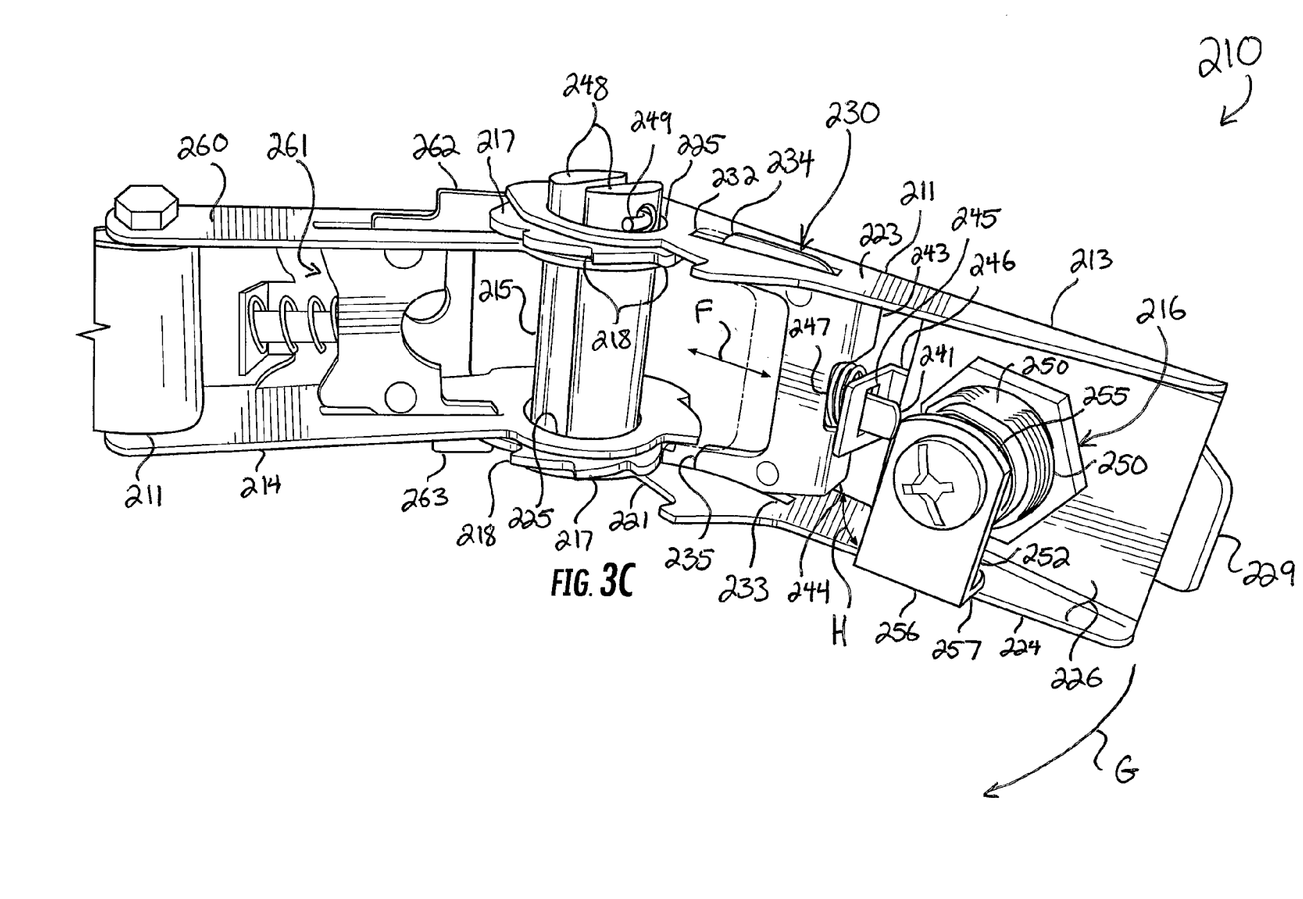

FIGS. 3A-3C illustrate another embodiment of a strap tie-down assembly 210 useful for adjustably tightening a strap 211 and locking the strap 211 to prevent unauthorized access thereto and release thereof. FIG. 3A is a top perspective view of the assembly 210, and FIGS. 3B and 3C are enlarged, bottom perspective views of the assembly 210 in a locked and unlocked configuration, respectively. The assembly 210 is somewhat similar to the assemblies 10 and 110. The assembly 210 includes a body 212 having opposed first and second handles 213 and 214. The first and second handles 213 and 214 are mounted and pivoted to each other on an axle 215 for pivotal movement about the axle 215. A lock 216 is mounted to the body 212 for movement between a locked position (shown in FIG. 3B) and an unlocked position (shown in FIG. 3C). In the locked position, the strap 211 cannot be removed from the assembly 210, while in the unlocked position, the strap 211 can be removed from the assembly 210. The lock 216 thus provides a valuable mechanism for preventing unauthorized access to and release of the assembly 210. The first and second handles 213 and 214, the axle 215, and the lock 216 are each constructed from a material or combination of materials having strong, rigid, durable, rugged, and aggressive material characteristics, such as metal (preferably steel or aluminum) or very hard plastic.

Referring primarily now to FIGS. 3B and 3C, the first handle 213 includes a monolithic frame 220 having opposed inner and outer ends 221 and 222 and opposed side members 223 and 224 extending between the inner and outer ends 221 and 222 and defining an open bottom 226. Bores 225 are formed through the side members 223 and 224 at the inner end 221 of the frame 220, and the axle 215 is disposed through and fixed in these bores 225. Opposite the axle 215, a gripping tab 229 extends transversely between the side members 223 and 224 at the outer end 222 of the frame 220, and the gripping tab 229 is fixed and secured to the side members 224 and 224, such as with rivets, bolts, screws, or other like fasteners.

A release mechanism 230 is carried in the frame 220 at the inner end 221. The release mechanism 230 engages with the axle 215 to selectively lock and unlock the axle 215 with respect to the first handle 213. Carried on the axle 215 are opposed and identical ratchet wheels 217 (one proximate to each of the side members 223 and 224) with a plurality of forwardly-pitched teeth 218. The release mechanism 230 engages with the teeth 218 of each of the ratchet wheels 217 to either allow the ratchet wheels 217 to rotate or prevent the ratchet wheels 217 from rotating. The release mechanism 217 is a plate carried in the frame 220 in slots 232 and 233 formed in the side members 223 and 224, respectively. The release mechanism has two pawls 234 and 235 which project inward toward the ratchet wheels 217 at an inner end 236 of the release mechanism 230. As the release mechanism 230 moves or is moved, the pawls 234 and 235 interact with the teeth 218 on the ratchet wheels 217. Opposed from the pawls 234 and 235, the release mechanism 230 has a U-shaped pull 240. The pull 240 is sized and shaped to allow a user to apply a finger against the pull 240 so that the user may draw the release mechanism 230 back by pulling against the pull 240. The release mechanism 230 is urged toward the axle 215 in response to such pulling. A torsion spring 242 is carried between the release mechanism 230 and the side member 223 to bias the release mechanism 230 toward the axle 215. The pull 240 includes two upwardly-turned tabs 243 and 244 which provide additional gripping area for a finger or fingers applied to the release mechanism 230. A tongue 241 extends outwardly from between the tabs 243 and 244 and extends through a slot 245 in a post 246 on the frame 220. The slot 245 in the post 246 maintains the tongue 241, and the release mechanism 230, in alignment in the first handle 213. A helical spring 247 is carried on the tongue 241 and is compressed between the post 246 and the release mechanism 230 to urge the release mechanism toward the axle 215.

The release mechanism 230 is mounted to the frame 220 of the first handle 213 for reciprocal movement between an advanced, engaged position with respect to the ratchet wheel 217, as shown in FIG. 3B) and a retracted, disengaged position with respect to the ratchet wheel 217 (as shown in FIG. 3C). The release mechanism 230 reciprocates along the length of the first handle 217, in a direction indicated by double-arrowed line F in FIG. 3C. When the release mechanism 230 is advanced into the engaged position thereof, as shown in FIG. 3B, the pawls 234 and 235 are engaged with the teeth 218 of the ratchet wheels 217. The first handle 213 may be moved, or "closed," along the direction indicated by the arcuate line G in FIG. 3B without causing movement in the ratchet wheels 217 or the axle 215; the pawls slide over and onto each subsequent tooth 218, cyclically sliding over one tooth 218 and springing into the bottom land between that tooth 218 and the next tooth 218. However, when the release mechanism 230 is in the engaged position thereof and the first handle 213 is moved in opposition to the arcuate line G in FIG. 3B, the pawls 234 and 235 cause the ratchet wheels 217 and the axle 215 to rotate with the first handle 213, in opposition to the arcuate line G. The pawls 234 and 235 engage and catch the faces of the teeth 218 and do not move over the teeth 218, thereby causing the ratchet wheels 217 and the axle 215 to move with the first handle 213. When the release mechanism 230 is in the disengaged position, the pawls 234 and 235 are away from the teeth 218 of the ratchet wheels 217 and impart no movement to the ratchet wheels 217, regardless of how the first handle 213 is moved along the line G.

The ratchet wheels 217 are fixed on the axle 215. The axle 215 is bifurcated into two semi-cylindrical posts 248 which rotate together. The ratchet wheels 217 are each formed with two semi-cylindrical slots through which the posts 248 of the axle 215 pass through. A pin 249 is used to secure the ratchet wheels 217 laterally on the axle 215.

The lock 216 is mounted to the first handle 213 for movement between the locked and unlocked positions. In the locked position, the lock 216 prevents movement of the release mechanism 230 out of the engaged position, and in the unlocked position, the lock 216 allows movement of the release mechanism 230 out of the engaged position. Thus, in the locked position, the strap 211 cannot be removed from the assembly 210, but in the unlocked position, the strap 211 can be removed from the assembly 210. The lock 216 includes a cylinder 250, a keyway 251 at a top of the cylinder 250, and a lock arm 252. The cylinder 250 is mounted in a top plate 253 formed integrally to the side members 223 and 224 and extending therebetween, opposite the open bottom 226 of the first handle 213. The gripping tab 229 is formed integrally to the top plate 253. The cylinder 250 is a cylindrical housing containing and protecting the mechanical components, such as a tumblers, pins, and springs, of the lock 216. The keyway 251 is exposed on a top surface 254 of the top plate 253 and is a slot providing access to a key into the cylinder 250 to engage with the mechanical components so as to enable a user to move the lock 216 between the locked and unlocked positions. The cylinder 250 extends through the top plate 253 so that the lock arm 252 is opposite the keyway 251 below the top plate 253. The lock arm 252 is an elongate member having a proximal end 255, a distal end 256, and an abutment face 257 at the distal end 256. The lock arm 252 is generally rectangular in footprint, though it can have other suitable shapes, and preferably has an L-shaped side profile in which the proximal end 255 extends directly radially outward from the cylinder 250 and the distal end 256 turns toward the top plate 253. The abutment face 257 is at the distal end 256 and is transverse to both the proximal end 255.

In the locked position of the lock 216, the lock arm 252 is directed toward the tongue 241 of the release mechanism 230 such that the abutment face 257 is in direct contact with the tongue 241 of the release mechanism 230. To move the release mechanism 230 out of the engaged position thereof, the release mechanism 230 must be drawn back away from the axle 215 and toward the gripping tab 229, along the line F of FIG. 3C. When the lock arm 252 is directed toward the tongue 241, however, the abutment face 257 is in contact with the tongue 241 and the release mechanism 230 cannot be moved. Thus, interaction between the flat abutment face 257 of the lock arm 252 and the tongue 241 of the release mechanism 230 prevents movement of the release mechanism 230 out of the engaged position shown in FIG. 3B. In the engaged position of the release mechanism 230 and the locked position of the lock 216, the pawls 234 and 235 are in contact with and cannot be moved over the teeth 218 of the ratchet wheels 217. The lock 216 prevents rearward movement of the release mechanism 230, thus preventing the pawls 234 and 235 from being drawn back with the release mechanism 230, and thus preventing the pawls 234 and 235 from disengaging from the teeth 218 of the ratchet wheels 217. In this way, the first handle 213 cannot be moved to impart relative movement to the ratchet wheels 217 and thus cannot impart relative movement to the axle 215, about which the strap 211 is wound. The lock 216 thus prevents the strap 211 from being unwound and removed from the assembly 10.

In the unlocked position of the lock 216, the lock arm 252 is directed away from the tongue 241 of the release mechanism 230 and is able to move clear of reciprocation of the release mechanism 230. The lock arm 252 pivots approximately ninety degrees in alignment between the locked and unlocked positions of the lock 216 along the double-arrowed arcuate line H shown in FIG. 3B. Lines G and H each define planes of movement which are normal to each other; thus, the first handle 213 is pivoted to move in a plane of movement which is normal to the plane of movement in which the lock arm 252 pivots between the locked and unlocked positions. In the unlocked position of the lock 216, the lock arm 252 is away from interaction and interference with the tongue 241 of the release mechanism 230, and the release mechanism 230 is free to reciprocate along the double-arrowed line F.

Opposite the first handle 213, the second handle 214 has a similar structure to the first handle 213. The second handle includes a frame 260 to which the strap 211 may be attached. The frame 260 carries a release mechanism 261, similar to the release mechanism 230, which includes pawls 262 and 263 that engage with the teeth 218 of the ratchet wheels 217. The release mechanism 261 is mounted for movement between an advanced position and a retracted position. In the advanced position of the release mechanism 261, the pawls 262 and 263 are engaged in contact with the teeth 218 of the ratchet wheels 217. In the retracted position of the release mechanism 261, the pawls 262 and 263 are disengaged from the teeth 218 of the ratchet wheels 217.

In operation, a user uses the lock 216 to prevent unwinding of the strap 211 from the assembly 210 after the user has tightened the strap about an object. The first and second handles 213 and 214 are used to ratchet the strap 211 down in increasing tightness about an object. When the strap 211 has been tightened to the user's desired level of security, the user inserts a key corresponding to the lock 216 into the keyway 251 and turns the key, thereby aligning the tumblers within the cylinder 250 so as to allow the lock arm 252 to rotate into engagement with the release mechanism 230, as shown in FIG. 3B. The user rotates the lock arm 252 into the engaged position toward the tongue 241 of the release mechanism 230. In this locked position, the release mechanism 230 cannot be retracted and the pawls 234 and 235 cannot be moved out of the engaged position with the teeth 218 of the ratchet wheels 217, so that the axle 215 cannot be rotated with respect to the first handle 213 and the strap 211 thus unwound.

When the user desires to loosen the strap 211, the user inserts the key into the keyway 251 and turns the key to rotate the lock arm 252 away from the position shown in solid line in FIG. 3B and into the position shown in FIG. 3C. With the lock 216 in the unlocked position thereof, the lock arm 252 is away from the release mechanism 230 and allows movement of the pawls 234 and 235 both out of the engaged position and between the engaged and disengaged positions. The user moves the release mechanism 230 into the disengaged position by applying a finger and drawing back on the pull 240 to retract the release mechanism along line F toward the gripping tab 229, thereby causing the pawls 234 and 235 to disengage from the teeth 218 of the ratchet wheels 217. The user may then pull on a free end of the strap wound about the axle 215 to cause the strap to unwind. Withdrawing fingers from the pull 240 will cause the release mechanism 230 to snap back toward the axle 215 and cause the pawls 234 and 235 to re-engage with the teeth 218. The strap cannot be unwound in this configuration unless the user retracts the release mechanism 230.

A preferred embodiment is fully and clearly described above so as to enable one having skill in the art to understand, make, and use the same. Those skilled in the art will recognize that modifications may be made to the described embodiment without departing from the spirit of the invention. To the extent that such modifications do not depart from the spirit of the invention, they are intended to be included within the scope thereof.

The invention claimed is:

1. A strap tie-down assembly for adjustably binding a strap, the assembly comprising: opposed first and second handles pivoted to each other about an axle configured to windably receive a strap for binding; a lock mounted for movement between a locked position in which the lock is operatively coupled in rigid, contacting engagement with the axle and prevents movement of the axle, and an unlocked position in which the lock is decoupled from rigid, contacting engagement with the axle and thereby allows movement of the axle; an arm carried on the lock; in the locked position of the lock, the arm limits movement of the pawl out of the engaged position; and in the unlocked position of the lock, the arm is away from the pawl and allows movement of the pawl out of the engaged position.

2. The assembly of claim 1, further comprising:
a ratchet wheel fitted on the axle;
a pawl mounted to the first handle for reciprocal movement between an engaged position with respect to the ratchet wheel in which the pawl prevents movement of the ratchet wheel and the axle, and a disengaged position with respect to the ratchet wheel in which the pawl allows movement of the ratchet wheel and the axle;
in the locked position of the lock, the lock prevents movement of the pawl out of the engaged position; and
in the unlocked position of the lock, the lock allows movement of the pawl out of the engaged position.

3. The assembly of claim 1, wherein the arm of the lock is mounted for pivotal movement to the first handle.

4. The assembly of claim 1, wherein: the pawl is biased into the engaged position thereof along a first direction; and in the locked position of the lock, the arm is aligned along the first direction.

5. The assembly of claim 2, wherein:
the first handle has a top plate, two opposed sides, an open bottom, and a top surface of the top plate opposite the open bottom;
the lock is mounted in the top plate; and
a keyway for the lock is disposed on the top surface of the top plate.

6. A strap tie-down assembly for adjustably binding a strap, the assembly comprising: opposed first and second handles pivoted to each other about an axle configured to windably receive a strap for binding; a ratchet wheel fixed to the axle; a pawl mounted to the first handle for reciprocal movement between an engaged position with respect to the ratchet wheel in which the pawl prevents movement of the ratchet wheel and the axle, and a disengaged position with respect to the ratchet wheel in which the pawl allows movement of the ratchet wheel and the axle; a lock mounted for movement between a locked position in which the lock is rigidly engaged in contact with the pawl and prevents movement of the pawl out of the engaged position, and an unlocked position in which the lock allows movement of the pawl out of the engaged position; an arm carried on the lock; in the locked position of the lock, the arm limits movement of the pawl out of the engaged position; and in the unlocked position of the lock, the arm is away from the pawl and allows movement of the pawl out of the engaged position.

7. The assembly of claim 6, wherein the arm of lock is mounted for pivotal movement to the first handle.

8. The assembly of claim 6, wherein: the pawl is biased into the engaged position thereof along a first direction; and in the locked position of the lock, the arm is aligned along the first direction.

9. The assembly of claim 6, wherein:
the first handle has a top plate, two opposed sides, an open bottom, and a top surface of the top plate opposite the open bottom;
the lock is mounted in the top plate; and
a keyway for the lock is disposed on the top surface of the top plate.

10. A strap tie-down assembly for adjustably binding a strap, the assembly comprising:
opposed first and second handles pivoted to each other about an axle configured to windably receive a strap for binding;
a ratchet wheel fitted on the axle;
a pawl mounted to the first handle for reciprocal movement between an engaged position with respect to the ratchet wheel in which the pawl prevents movement of the ratchet wheel and the axle, and a disengaged position with respect to the ratchet wheel in which the pawl allows movement of the ratchet wheel and the axle; and
a lock including an arm, the lock mounted for movement between a locked position in which the arm of the lock is against the pawl and prevents movement of the pawl out of the engaged position, and an unlocked position in which the arm of the lock is away from the pawl and allows movement of the pawl out of the engaged position.

11. The assembly of claim 10, wherein the lock is mounted for pivotal movement to the first handle.

12. The assembly of claim 10, wherein:
the pawl is biased into the engaged position thereof along a first direction; and
in the locked position of the lock, the arm of the lock is aligned along the first direction.

13. The assembly of claim 10, wherein:
the first handle has a top plate, two opposed sides, an open bottom, and a top surface of the top plate opposite the open bottom;
the lock is mounted in the top plate; and
a keyway for the lock is disposed on the top surface of the top plate.

* * * * *